United States Patent [19]

Ptacek et al.

[11] 3,962,627

[45] June 8, 1976

[54] ELECTRONIC APPARATUS FOR TESTING MOVING COINS EMPLOYING SUCCESSIVE TIME SIGNIFICANT SENSINGS OF THE EFFECTS OF PROXIMITY OF A COIN UNDER TEST TO INDUCTIVE IMPEDANCE ELEMENTS UPON THE EFFECTIVE IMPEDANCES THEREOF

[75] Inventors: James F. Ptacek, Kansas City, Mo.; Leon J. Shaneyfelt, Lenexa, Kans.

[73] Assignee: The Vendo Company, Kansas City, Mo.

[22] Filed: Dec. 20, 1974

[21] Appl. No.: 535,021

[52] U.S. Cl............................ 324/34 R; 194/100 A
[51] Int. Cl.[2]........................................ G01R 33/12
[58] Field of Search.............. 324/189, 34 R, 40, 41, 324/5, 61 R; 194/100 R, 100 A, 101

[56] References Cited
UNITED STATES PATENTS

| | | | |
|---|---|---|---|
| 3,090,910 | 5/1963 | Moran | 324/40 |
| 3,715,656 | 2/1973 | Hyde et al | 324/61 R |
| 3,761,805 | 9/1973 | Dornberger | 324/189 |

*Primary Examiner*—Robert J. Corcoran
*Attorney, Agent, or Firm*—Schmidt, Johnson, Hovey & Williams

[57] ABSTRACT

An improved method and apparatus for testing coins, metallic credit tokens and similar objects, capable of determining both type or denomination and genuineness thereof, utilize the effect upon the electrical impedance of a sensing component from the presence of an object under test in physical proximity to such component and the effect upon the direct current time constant of an electrical circuit containing such component from the influence of presence of such object upon the effective electrical impedance of such component, and employ a novel testing technique primarily involving determining whether or not a direct current voltage output from such circuit has risen to within a predetermined range of voltage level thereof in time coincidence with an interval of test enablement occurring a predetermined period of time, characteristic of acceptable objects of the particular kind being tested for, after an initial direct current energization of such circuit. Thus, dependence upon direct object-to-object comparisons, sensing of frequencies or other alternating current parameters, and even direct quantitative measurement of impedance values, all of which are difficult or expensive to carry out reliably, are avoided; and, since the influence of the object under test need be detected only in terms of comparative sensing of a time dependent direct current voltage level for conformity with a predetermined level range, the only really critical quantitative measurement or sensing required by the improved testing technique relates merely to time parameters, which can conveniently be accomplished with high precision and reliability through the use of relatively simple and economical apparatus. The essentially time oriented nature of the method advantageously permits its preferred implementation predominantly with digital time reference base generating and coincidence logic type apparatus to provide the mentioned precision and reliability in small space and with modest power requirements. The preferred form of sensing component is simply an inductance coil. The method and apparatus desirably permit the testing to be accomplished while the coin or other object is continuously moving along a test path, such as while rolling down a ramp under the influence of gravity. The preferred form of apparatus also includes features providing great convenience and versatility in readily adapting or adjusting the same for the testing of different types and denominations of domestic and foreign coins or the like.

12 Claims, 16 Drawing Figures

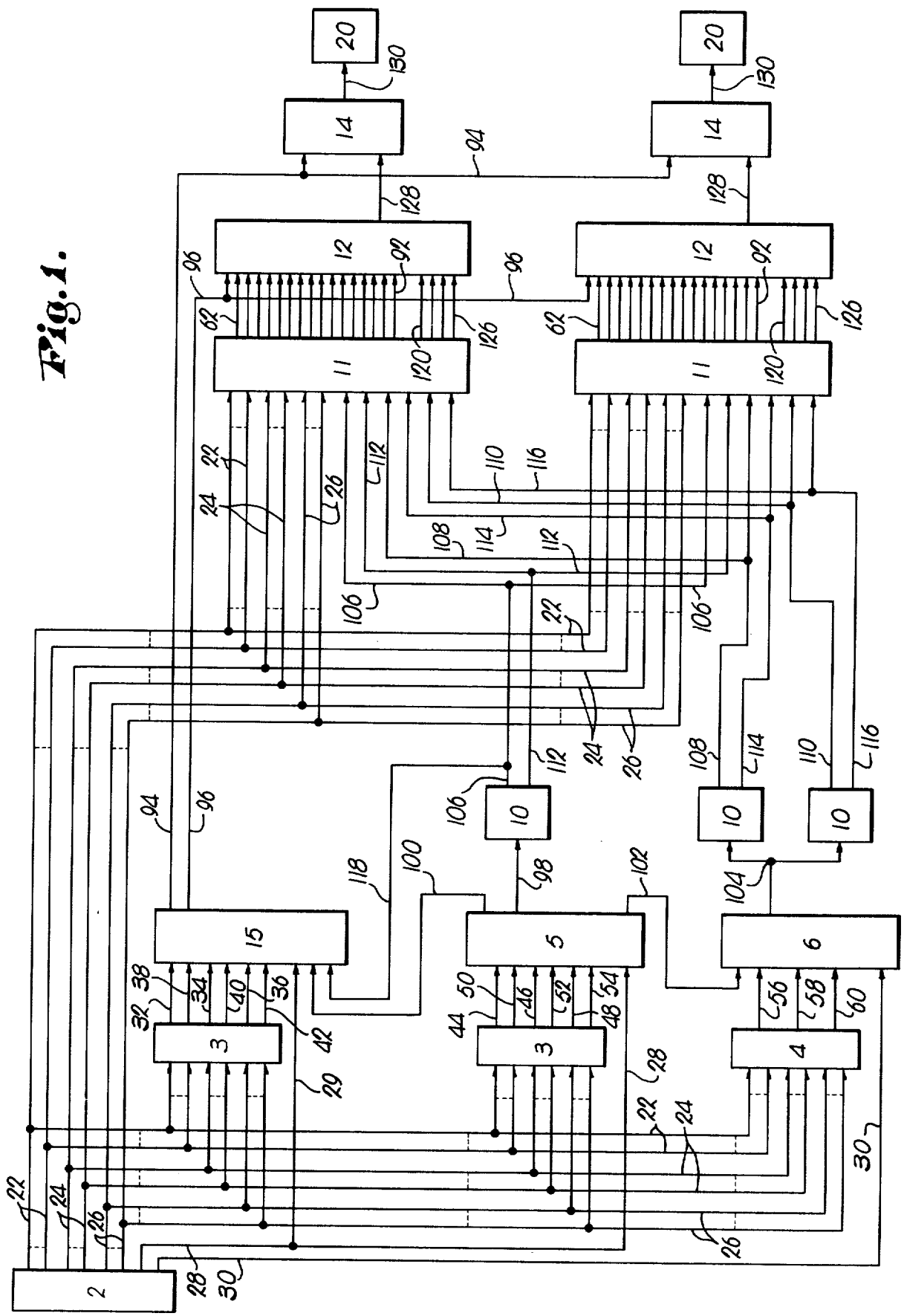

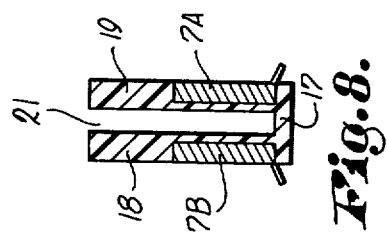
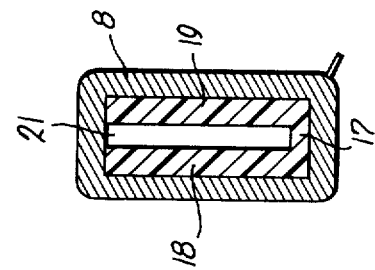
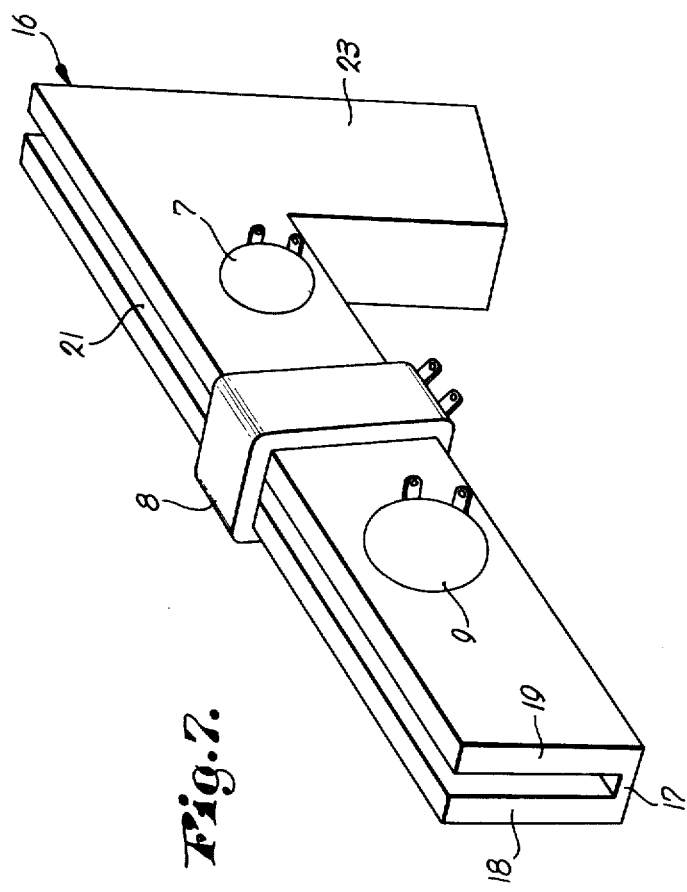

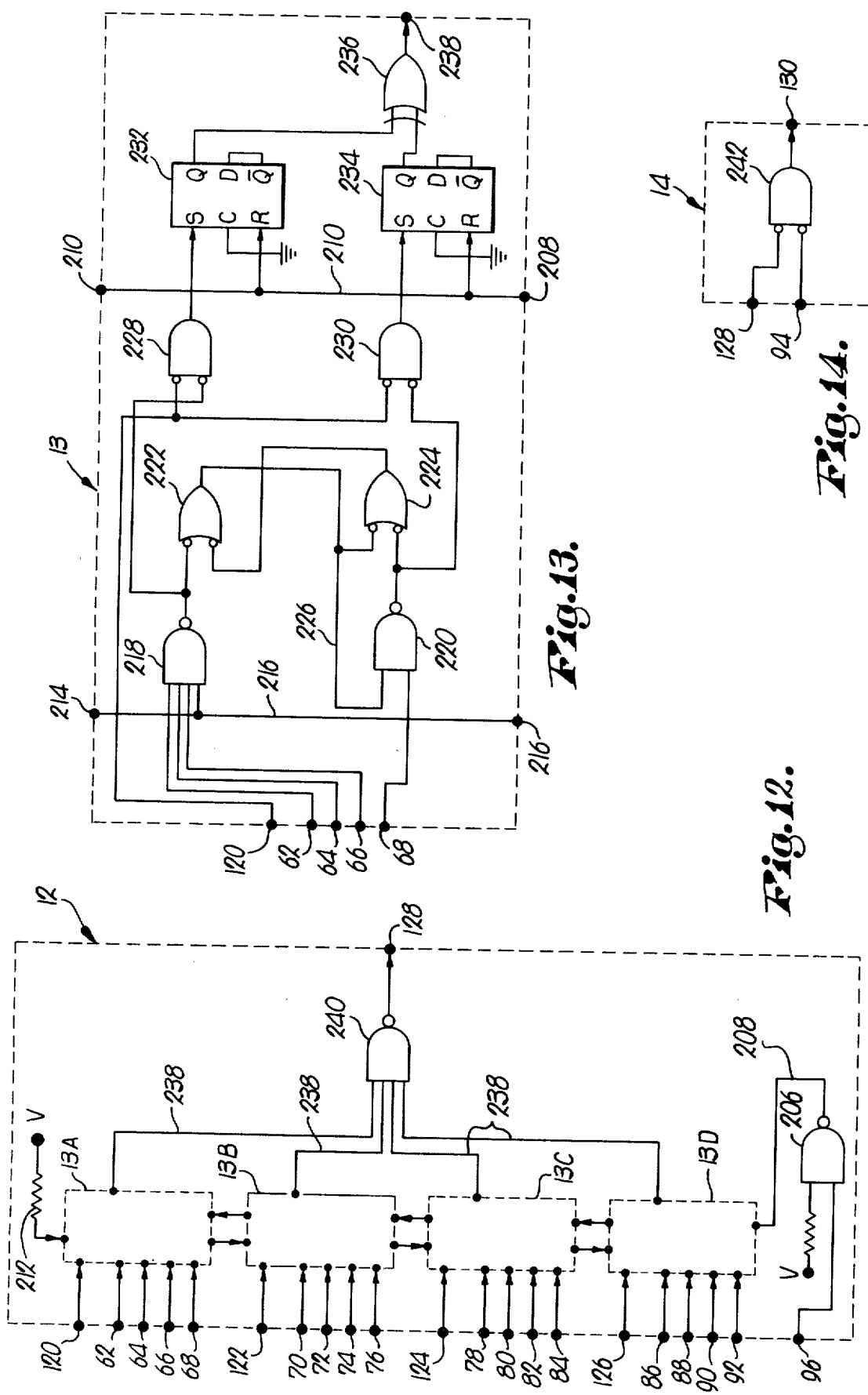

ELECTRONIC APPARATUS FOR TESTING MOVING COINS EMPLOYING SUCCESSIVE TIME SIGNIFICANT SENSINGS OF THE EFFECTS OF PROXIMITY OF A COIN UNDER TEST TO INDUCTIVE IMPEDANCE ELEMENTS UPON THE EFFECTIVE IMPEDANCES THEREOF

This invention relates to an improved method and apparatus for testing coins, metallic credit tokens and similar objects.

For many years heretofore, the testing of objects such as coins for type or denomination and genuineness, in applicational environments such as vending machines, has been almost universally carried out by means of small, but complex, essentially mechanical devices known as coin acceptors or slug rejectors, which gauge an object under test with respect to its conformity with tolerance limits established for acceptable objects as to various dimensions, weight, magnetic properties and other physical parameters, and then appropriately divert or impede the path or progress of the object through the maze of gauging stations provided in the device dependent upon its conformity with testing criterion established in the device during manufacture or by adjustment thereof. Despite the ingenuity of and long service that such devices have rendered in attempting to cope with an otherwise unsatisfied need of the mechanized product vending and related industries, they are inherently subject to many disadvantages largely stemming from their essentially mechanical nature, including their susceptibility to malfunction and need for relatively frequent repair or readjustment arising in part from their multiplicity of critical mechanical parts and relationships and in part from the adverse physical environments in which such devices are expected to function, their related susceptibility to misadjustment by unskilled persons having access thereto while resupplying a vending machine with products, their normal limitation to testing just a single group of coin types and denominations for which the particular device was manufactured, etc.

In view of such disadvantages and limitations of the conventional mechanical type coin testing devices, various attempts to accomplish the testing of coins and the like by more electrically oriented means have from time to time been suggested. However, insofar as we are aware, none of such suggestions has heretofore resulted in any really satisfactory solution to the problem, probably because such attempts have essentially followed the most natural path of trying to merely substitute, in place of the direct mechanical gauging of physical parameters of a coin being tested under close tolerance requirements (as done by the mechanical testing devices), some quasi-equivalent form of direct quantitative measurement of some electrical parameter of the coin being tested, which is not only subject to at least equally critical tolerance requirements, but also subject to difficulties of accuracy, reliability and cost in effecting the required electrical measurement that are even more demanding than the gauging of physical parameters by mechanical testing devices.

Examples of such unsatisfactory prior efforts to find an electrical solution to the coin testing problem are understood to have included attempts to employ a direct measurement of the frequency of an oscillatory circuit having tank components whose frequency of resonance is affected by the presence of a coin under test, attempts to directly measure impedance parameter values of a coin under test, attempts to directly measure and compare impedance parameters of both a reference coin employed as a standard and a coin under test, etc. The more obvious approaches to the electrical testing of coins are also vulnerable, on the one hand, to the selection of some single electrical parameter of the coins to be tested which is insufficient to distinguish between acceptable and nonacceptable coins without either extremely precise measurements or loss of reliability, or, on the other hand, to complex and expensive attempts to measure each of a multiplicity of electrical parameters with some practically realizable degree of individual accuracy in order to approach the minimum required reliability on a multiple test criteria basis.

We have discovered, among and in combination with the other things hereinafter set forth in the following description of a currently preferred embodiment of our invention or otherwise apparent therefrom to those skilled in the art, that the effective impedance of a simple sensing component such as an inductance coil, when a coin is brought into physically proximate "core-relationship" therewith and the coil is energized, changes with time in manner which is unique for different types or denominations of coins; that the manner in which the effective impedance of the sensing component changes is a sufficient testing criterion from which to reliably distinguish between genuine and non-genuine coins or the like of a wide variety of denominations and types (since such criterion appears to uniquely reflect the merged effects of a number of other individual parameters of each particular type of coin, including size, conductivity or composition, magnetic properties, etc); that the changes in effective impedance of such a sensing component brought about by the presence of a coin under test can be most simply, accurately and reliably sensed in terms of the time it takes, after an initial direct current energization of a circuit containing the sensing component in series with another fixed impedance, until a direct current output voltage across the latter impedance builds to a predetermined level; that such predetermined output voltage level may be chosen at any level at which there is substantial deviation in its time of occurrence with a given sensing component and a genuine coin of particular type of denomination, as compared with the time of occurrence of such level in the absence of a coin; that attainment or non-attainment by such output voltage of such predetermined level thereof can best be detected by simple electrical comparison of the level of said output voltage with a standard reference voltage of the predetermined level; that the unique period of time required for such output voltage to attain such predetermined level thereof after initial energization of the circuit containing the sensing component can be accurately predetermined for each type of coins later to be tested by pretesting a number of known genuine coins of each such type; and that testing of coins or the like then further requires merely providing a reference base for the measurement of time, and sensing for time coincidence or lack thereof between the attainment by such output voltage of its predetermined reference level, after energization of the sensing component with a coin to be tested present thereat, and the occurrence of a testing interval at the end of such predetermined period of time following such energization that is applicable to the particular type of coin being tested for. In a broader sense, we believe we have discovered an unexpected, new, simple and reliable way to reduce the problem of successful electrical testing of coins and the like essentially to a time-oriented technique involving, apart from straight-forward comparative sensing of the level of a direct current voltage, the quantitative measurement only of time (and that in manner requiring merely determination of time coincidence between a voltage sensing event and a testing interval occurring at the end of a predetermined period following an initiating event represented by the start of energization of the sensing component).

Accordingly, it is the primary object of our invention to apply our discoveries and the other concepts and improvements herein disclosed to overcome the disadvantages and limitations of previous means for the testing of coins and the like by providing a practical, versatile and reliable method and apparatus for the accomplishment of such function employing predominantly time-oriented, digital and coincidence logic type techniques.

Other more specific, but important, objects of the invention will be made clear or become apparent from the accompanying drawings and the detailed description of a preferred embodiment that follows.

In the drawings:

FIG. 1 is a block diagram showing the principal functional units and interrelationships involved in the currently preferred embodiment of apparatus for practicing our invention, to which reference will herein be made as a basis for describing and explaining an illustrative application of the novel concepts of out invention;

FIG. 7 is a somewhat diagrammatic perspective view of the type of ramp and coil assembly employed in the preferred embodiment;

FIG. 8 is a transverse cross-sectional view of the ramp and coil assembly taken on a plane cut through one of the inductance coils that is wound generally parallel to the path of travel of a coin to be tested and shows the pair of winding sections thereof on opposite sides of said path;

FIG. 9 is a transverse cross-sectional view of the ramp and coil assembly taken on a plane cut through the inductance coil wound transversely and in circumscribing relationship to the coin path;

FIG. 12 is a schematic diagram of validation logic units of the preferred embodiment, with individual logic modules thereof indicated by dotted blocks (as shown in FIG. 13);

FIG. 13 is a schematic diagram of the individual logic modules of the validation logic units of the preferred embodiment shown in FIG. 12;

FIG. 14 is a schematic diagram of the coin acceptance utilization enable units of the preferred embodiment;

Figures 2, 3, 4:
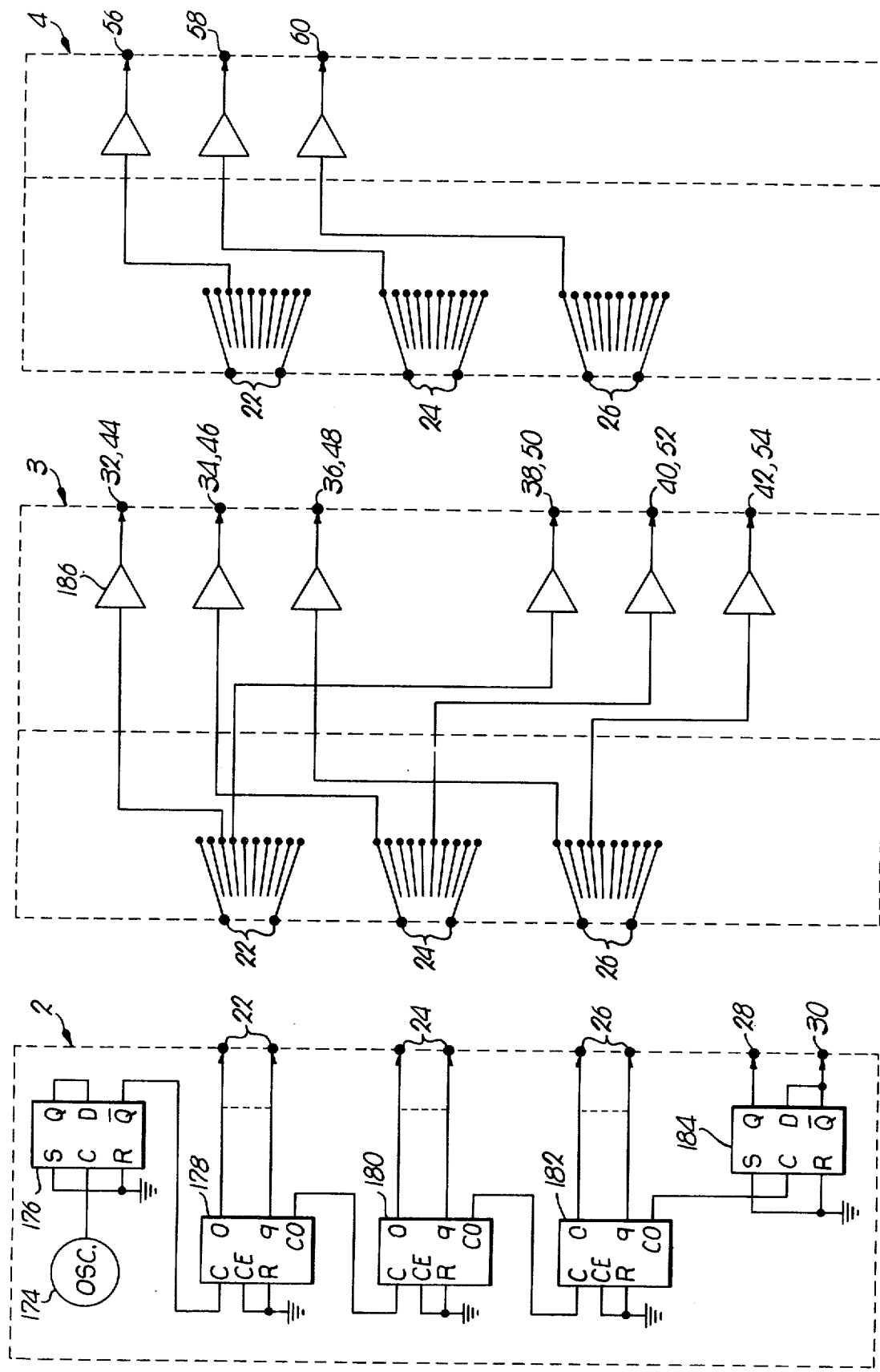
FIG. 2 is a schematic diagram of the main system clock used for generating time base reference signals in the preferred embodiment.
FIG. 3 is a schematic diagram of the type of programmed time reference decoding and coupling units used in the preferred embodiment for selectively coupling the time base reference signals from the system clock with the primary coil drive unit (as shown in FIG. 5) and with the secondary timing and control unit (as shown in FIG. 15)
FIG. 4 is a schematic diagram of the type of programmed time reference decoding and coupling units used in the preferred embodiment for selectively coupling the time base reference signals from the system clock with the auxiliary coil drive unit (as shown in FIG. 6)

The salient points of the method aspect of our invention have hereinbefore been sufficiently noted, and will be so further clarified by an understanding of the nature and operation of a preferred embodiment of out apparatus for practicing our method, that it appears appropriate to proceed directly to a consideration of the latter, while bearing in mind the basic significance from the method standpoint of our avoidance of difficult quantitative measurements of electrical parameters and our employment instead of primarily time-oriented coincidence of event detection in conjunction with simple direct current voltage comparison sensing. Accordingly, wide use can be made of combinatorial logic and integrated circuit components in implementing the apparatus aspects of the invention. By the same token, however, as those skilled in the art are fully aware, almost any given arrangement of combinatorial logic circuitry can be implemented by or converted into a number of functionally equivalent forms employing specifically different types and arrangements of gates. It should be understood, therefore, that the preferred embodiment chosen for explaining the apparatus aspects of our invention is essentially intended as illustrative and that details thereof at the skill-of-the-art convertible level for deriving functional equivalents thereof should not be deemed as limiting the fair scope of the invention as claimed.

Referring initially to the overall block diagram of the illustrative embodiment of apparatus in FIG. 1, the blocks therein representing primary functional units are each generally designated by a reference numeral corresponding with the number of the Figure of the drawings in which it is further depicted; such units include the system clock unit 2, the programmed coupling units 3 and 4, the coil drive units 5 and 6, the coil and comparator units 10, the programmed coupling units 11, the validation logic units 12, the acceptance utilization enable units 14, and the secondary timing and control unit 15. Also shown in FIG. 1 and depicted merely in the form of functional blocks are coin acceptance signal utilization units 20, which it should be understood each represent any appropriate circuitry or electrically responsive mechanism in a vending machine, coin changer, coin totalizer or the like needing and capable of utilizing electrical signals from the apparatus of this invention indicating that coins of particular denominations have been accepted as genuine. FIG. 1 also indicates the primary electrical connection paths (assuming common grounding connections not shown in FIG. 1) between the various functional units. It should be observed that in a physical embodiment, most or all of the interconnections necessarily depicted as somewhat rambling lead in FIG. 1 will acutally be incorporated into the plug-in programmed coupling units 3, 4 and 11 (which may be hard-wired, as illustrated, or could be implemented through the employment of memory circuit techniques), the socket means provided for receiving the latter, and relatively short printed circuit board connections on the base upon which the various integrated circuit modules and other components making up the apparatus (except for the ramp and coil assembly shown in FIG. 7) are mounted.

Nevertheless, it should be helpful to note, before leaving FIG. 1, the general nature of the primary inter-unit electrical coupling paths. The system clock unit 2, in manner later discussed, generates time base reference signals in sequence representing 1000 equal short intervals of time, which are made available in digital form as pulses upon ten "units" lines 22, ten "tens" lines 24 and ten "hundreds" lines 26, each such set of ten lines 22, 24 and 26 being shown throughout the drawings as a pair of bounding lines having dotted transverse lines at intervals therealong. The sets 22, 24 and 26 of digital time reference pulse lines lead to each of the coupling units 3, 4 and 11 so as to make available to latter, for selection in accordance with predetermined internal wiring by which they are "programmed", any combinations of three pulses each (one "units", one "tens" and one "hundreds") representing times successively referenced herein as times "000" through "999". The clock unit 2 also generates a pair of initiate triggering, time signals, which both coincide with time "000" (after an initial count-through cycle by the unit 2), but which occur alternately (to minimize load on the power supply) at the end of successive full count-through cycles of the unit 2, one of which is coupled with the primary coil drive unit 5 by lead 28 and with the secondary timing and control unit 15 by leads 28 and 29, and the other of which is coupled with the auxiliary coil drive unit 6 by lead 30.

The coupling unit 3 associated with the secondary time and control unit 15, by virtue of its "programmed" internal connections (or a memory equivalent thereof), selects a pair of each of the "units" lines 22, "tens" lines 24 and "hundreds" lines 26, to provide pulse sets representing two digital times between "000" and "999", and couples them to the control unit 15 by leads 32, 34 and 36 and leads 38, 40 and 42. The coupling unit 3 associated with the primary coil drive unit 5 does likewise as to the latter by leads 44, 46 and 48 and leads 50, 52 and 54. The coupling unit 4 similarly selects and couples one each of the time pulse lines 22, 24 and 26, representing a single digital time code for a time between "000" and "999", to the auxiliary coil drive unit 6 by leads 56, 58 and 60. In generally similar fashion, the coupling unit 11 associated with each validation logic unit 12 (of which a pair are included for illustrating the structure for handling the testing of a pair of different types or denominations of coins) selects and couples to the latter three sets of timing digital codes derived from lines 22, 24 and 26 (although FIG. 11 also illustrates the manner in which codes that have one or more identical digets are selected), together with three additional single digit "units" time codes employed in manner hereinafter explained, by sixteen leads which appear as the upper group in FIG. 1 between and including leads 62 and 92, but which are individually reference numbered only in FIGS. 11 and 12 due to space considerations and interests of clarity in the drawings.

The secondary timing and control unit 15 which recycles during each overall cycle of the system clock unit 2, at appropriate predetermined times generates and supplies an acceptance utilization enable signal to both of the utilization and enable units 14 by line 94, and a reset signal to both of the validation logic units 12 by line 96.

The primary coil drive unit 5 delivers an initiate signal to the corresponding coil and voltage comparator unit 10 by lead 98. The drive unit 5 also delivers a status signal to the secondary timing and control unit 15 by line 100 and to the auxiliary coil drive unit 6 by line 102. Similarly, the auxiliary coil drive unit 6 delivers an initiate signal to each of the corresponding coil and voltage comparator units 10 by branching line 104.

Each of the coil and voltage comparator units 10 provides a first, say higher, voltage test result signal to both of the coupling units 11 by leads 106, 108 and 110 for the respective units 10, and a lower voltage test result signal to both of the coupling units 11 by leads 112, 114 and 116 for the respective units 10. The coil and voltage comparator unit 10 associated with the primary coil drive unit 5 also delivers a coin present and test initiated sensing signal to the secondary timing and control unit 15 by line 118.

Each of the coupling units 11 selects and delivers to the corresponding validation logic unit 12 selected high and low voltage test result signals from a pair of the coil and comparator units 10 and derived from lines 106–116, but with the selection of one of the coil and comparator units 10 (from the three of same available in the preferred embodiment) normally being different for the respective validation logic units 12, these couplings being effected by lines 120, 122, 124 and 126.

Each of the validation logic units 12 delivers a coin acceptance signal to the corresponding acceptance utilization enable unit 14 by a line 128. And finally, each of the utilization enable units 14 delivers an acceptance utilization signal to the corresponding utilization unit 20 by a line 130.

It will be understood by those skilled in the art that as many sets of corresponding units 11, 12, 14 and 20 may be provided as there are types and denominations of coins to be tested, only two such sets being illustrated in FIG. 1 as exemplary (such as for testing United States quarters and dimes, for instance), and will further understand that, regardless of the number of sets of units 11, 12, 14 and 20 employed, no more than the illustrated number of units 2, 3, 4, 5, 6, 10 and 15 should be required, since it has been found that three units 10 respectively utilizing coils of the differing sizes and types described should suffice for reliably testing virtually any known type of denomination of domestic or foreign coinage.

To facilitate reference between the overall block diagram of FIG. 1 and the more detailed showings of the particular units 2, 3, 4, 5, 6, 10, 11, 12, 13, 14 and 15 in the other Figures of the drawings, the terminals in the latter have been designated with reference numerals corresponding as closely as possible to those identifying the corresponding coupling lines in FIG. 1.

Assuming the effectiveness of the various units 2, 5, 6, 10, 12, 14 and 15 to produce the various functional signals noted above, as will be made clear hereinafter, most of those skilled in the art will already appreciate from the foregoing that operation of the preferred embodiment of our apparatus, to test a coin juxtaposed in "core-relationship" proximity to an inductance coil 7, 8 or 9 of a coil and comparator unit 10 (see: FIGS. 7 and 19) to alter the effective impedance thereof, basically involves iteration of the following operations: the system clock unit 2 generates an initiate triggering signal delivered to, for example, the primary coil drive unit 5 via line 28; when the appropriate point in the overall cycle of clock unit 2 occurs, as communicated to the drive unit 5 from the clock unit 2 via lines 22, 24 and 26, the coupling unit 3 and lines 44–54, the drive unit 5 then delivers an initiate signal to the corresponding coil and comparator unit 10, which energizes a coil (say 7) with a direct current voltage to produce a direct current output voltage of time varying level internally coupled with the high and low voltage comparators in the unit 10, as hereinafter more fully expalined; the system clock unit 2 also delivers a test sequence initiate timing signal to the secondary timing and control unit 15 via lines 22, 24 and 26 at an appropriate time after energization of the coil; when the level of the output voltage from the coil of the unit 10 rises sufficiently for one of the latter's voltage comparators to produce an output, such output is delivered to the secondary timing and control unit 15 as a coin present and test initiated signal via line 118 which, if it coincides with the test sequence initiate signal from the clock unit 2, is effective to initiate the relatively long operating cycle of the unit 15; as the time varying level of the output voltage within unit 10 continues to rise and to be fed to the voltage comparators provided therein, the latter will each deliver binary logic type voltage test result signal (indicating when the level of the varying internal output voltage reaches the corresponding predetermined reference level) to the validation logic units 12 via lines 106 and 112, the coupling units 11 and lines 120 and 122; a predetermined period of time after the initiation of the test by delivery of the initiate signal to the unit 10, a voltage test enable interval occurs in response to time reference signals delivered to the validation logic units 12 from the system clock unit 2 via lines 22, 24 and 26, the coupling units 11 and lines 62–92, and, if the voltage test result signals being also delivered to the validation logic units 12 from the coil and comparator unit 10 as aforesaid coincide in time with the voltage test enable interval, an acceptable voltage test result for testing by the coil 7 will be registered in the validation logic units 12; then, presuming testing of each coin by two coils as contemplated in our preferred embodiment, essentially the same operations will be repeated with the coin juxtaposed with say coil 8 through the corresponding units 4, 6, 10, 11 and 12 and associated coupling lines, resulting in either the registering or non-registering of an acceptable voltage test result for the coil 8 in at least one, say the upper of the validation logic units 12; if acceptable voltage test results for both coils 7 and 8 are registered in the upper validation logic unit 12, the latter will then deliver a coin acceptance signal to the corresponding utilization enable unit 14 via line 128; then, when the next acceptance utilization enable signal is delivered to the corresponding utilization enable unit 14 via line 94 from secondary timing and control unit 15, if a coin acceptance signal has also been registered by the utilization enable unit 14, the latter will deliver an acceptance utilization signal to the corresponding utilization unit 20 via line 130; and finally, the secondary timing and control unit 15 will deliver a reset signal to the validation logic units 12 via the line 96 for resetting the registering elements (flip-flops) in the units 12 for the next testing cycle. It will be further understood that each testing cycle is carried out during an extremely short period of time and that our preferred embodiment provides for repetitive test cycles during the passage of a coin through each of the coils 7, 8 and 9, and during one full operating cycle of the slower secondary timing and control unit 15, as hereinafter more fully explained.

Referring next to FIGS. 7, 8 and 9, our preferred form of ramp and coil assembly generally designated 16 will be seen to include a channel-like coin support 23 having an inclined bottom wall 17 and a pair of spaced sides 18 and 19, presenting a laterally bounded, longitudinally inclined ramp zone 21 of sufficient height and width to accommodate any coins to be tested for free gravitational movement from the upper to the lower end thereof. The support 23 is formed of plastic or other nonmagnetic and electrically nonconductive material. It will be understood that the utilization units 20 may include some appropriate form of electrically actuated means (not shown) for diverting or otherwise managing coins leaving the lower end of the ramp zone 21 in accordance with the results of testing as to denomination, genuineness or both, if desired, but the details of any such means do not form a part of our subject invention.

The inductance coil 7, which is closest to the upper end of the ramp zone 21, is pi wound and of relatively low Q; it is wound in two spaced, series connected winding sections 7A and 7B that are disposed in spaced, opposed relationship on opposite sides of zone 21 for passage of a coin under test therebetween to assure a good "core-relationship" of the coin to the coil 7. The sections 7A and 7B are preferably embedded in the sides 18 and 19 and actually extend inwardly as closely as practicable to the zone 21, while leaving only a sufficient thickness of the sides 18 and 19 between them and the zone 21 to reduce friction for a rolling coin under test. We prefer a diameter for the coil 7 approximately equal to that of a United States nickel. The lower coil 9 is in all respects similar to coil 7, except that coil 9 is preferably of diameter approximately equal to that of a United States half dollar. The middle coil 8 is wound around the zone 21 and inclined portion of the support 23 transversely thereto and so that the turns of the coil 8 circumscribe the zone 21. The coil 8 must be of sufficient inner vertical dimension to clear any coin to be tested for free passage down the zone 21. The coils 7 and 8 are normally utilized for testing coins of samller size, while coils 8 and 9 are utilized for testing larger size coins (although in our preferred embodiment coil 7 is still employed in connection with production of the coin present and test initiate signal needed by the secodary timing and control unit 15).

Figures 10, 11:
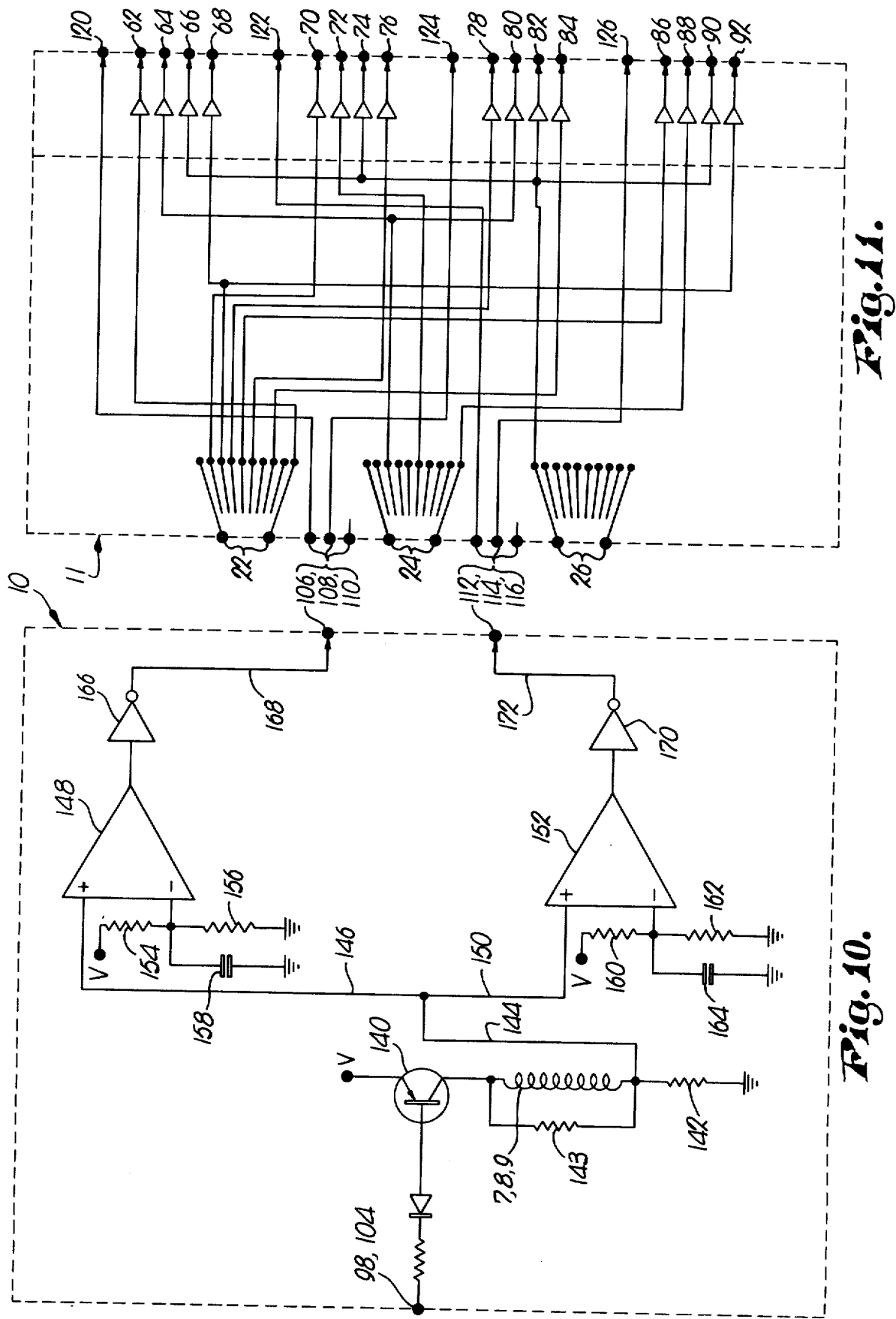
FIG. 10 is a schematic diagram of the inductance coil and associated voltage comparators units of the preferred embodiment.
FIG. 11 is a schematic diagram of the type of programmed time reference decoding and coupling units used in the preferred embodiment for selectively coupling the time base reference signals from the system clock with the validation logic units of the preferred embodiment (as shown in FIGS. 12 and 13)

Referring next to FIG. 10, each of the coil and comparator units 10 includes, besides the coil 7, 8 or 9, as the case may be, a transistor 140 employed as an electrically responsive switch between a direct current voltage V of typically +12 volts applied to its emitter and a series circuit including the coil 7, 8 or 9 and a fixed resistance of typically between 20 and 60 ohms coupled between its collector and ground. A resistance 143 of typically 1000 or more ohms is shunted across the coil 7, 8 or 9 to stabilize transient effects. An initiate signal applied from terminal 98 or 104 to the base of transistor 140 through a resistance and a diode causes the normally cutoff transistor 140 to conduct between its emitter and its collector, thereby initiating energization of a series through coil 7, 8 or 9 and the current sensing resistance 142 and producing a direct current output voltage upon the lead 144 relative to ground, which varies as a function of time and the effective impedance of the coil 7, 8 or 9 portion of the voltage divider 7, 8 or 9 and 142.

When the series circuit 7, 8 or 9 and 142 is initially energized, the level of the direct current voltage output commences to rise from ground level, at a generally exponential rate essentially determined by the natural transient frequency of the series circuit (equal to the inductance of the coil 7, 8 or 9 divided by the sum of the resistance of the coil 7, 8 or 9 and the resistance 142), toward a maximum of equilibrium level (equal to the product of the voltage V and the resistance 142 divided by the sum of the resistance of the coil 7, 8 or 9 and the resistance 142). We have found that the presence of a coin in core-relationship proximity to a given coil 7, 8 or 9 not only changes the effective impedance of the latter, but also significantly alters the shape of the voltage level vs. time curve of the rising voltage level on the output lead 144, and does so in manner presenting substantially different curves for different types and denominations of coins which respectively and uniquely characterize the latter. It is also noted that such curves for different coin types and denominations differ significantly not only with respect to the time required for the output voltage level on lead 144 to reach the maximum or equilibrium level, but also with respect to the time required for such voltage to reach any given intermediate levels. In view of our preference for testing coins while continuously moving through the coils 7, 8 and 9, and in order to assure that successive relative juxtapositions between the coin and the coils 7, 8 and 9 will have no possible adverse effect upon the ultimate validity of the testing, each coil 7, 8 and 9 is subjected to a number of energization cycles during the passage of a coin therethrough, and we also prefer to establish the voltage levels at which the more critical time determination is made at points on the rise curve for the coin being tested that deviates as much as possible from the rise curve for the coil alone. Once a suitable voltage level is selected for a particular type and denomination of coin, coil 7, 8 or 9, supply voltage V, resistance 142 and type of transistor 140, the period of delay between test initiation by energization of the coil 7, 8 or 9 and the testing interval is quickly, conveniently and best predetermined by pretesting a reasonable number of known genuine coins of the type and denomination in question; and it will be found that such delay period is quite consistent amoung genuine coins of the same type and denomination so that the testing interval may be relatively short for maximum sensitivity in discriminating between genuine and non-genuine coins. As a general guide, however, it is noted that we have found that, with our preferred embodiment, for testing United States quarters at about the optimum voltage levels a delay period of about 28 microseconds and a testing interval of about 2.5 microseconds is satisfactory for coil 7, a delay period of about 13 microseconds and a testing interval of about 2.5 microseconds is satisfactory for coil 8, and a delay period of about 52 microseconds and a testing interval of about 4.5 microseconds is satisfactory for coil 9.

The direct current voltage output on line 144 of each coil and comparator unit 10 is coupled internally thereof by a line 146 to the positive input terminal of a first conventional voltage comparator module 148 and by a line 150 to the positive input terminal of a second conventional voltage comparator module 152. The negative input terminal of the comparator 148 is coupled with the tap point between the series coupled resistances 154 and 156 of a voltage divider coupled between a fixed positive supply voltage (typically 12 volts) and ground, such tap point also being bypassed to ground against transients by a capacitance 158. Similarly, the negative input terminal of the comparator 152 is coupled with the tap point between the series coupled resistances 160 and 162 of a voltage divider coupled between a fixed positive voltage (again, typically 12 volts) and ground, with such tap point also bypassed to ground by a capacitance 164. Thus, the negative terminal of each comparator 148 and 152 of each unit 10 is continuously supplied with a positive direct current reference voltage of fixed predetermined level depending in each instance on the relative values of the resistances 154 and 156 or 160 and 162, as the case may be. Relative values of the resistances 154, 156, 160 and 162 are so selected that the reference voltage level applied to the comparator 148 will be slightly higher than that applied to the comparator 152 in each unit 10 (typical values for the resistances 154 and 156 being 7.5K ohms and 38K ohms respectively, with the resistances 160 and 162 being 10K ohms and 2K ohms respectively). Thus, the comparator 148 functions as a higher voltage detection comparator, while the comparator 152 functions as a lower voltage detection comparator. The binary logic test result signal from the output terminal of the higher voltage level testing comparator 148 is, in the preferred embodiment, coupled through a conventional inverter-amplifier 166 and line 168 with the terminal and line 106, 108 or 110, as the case may be. Similarly the binary logic test result signal from the output terminal of the lower voltage level testing comparator 152 is coupled through a conventional inverter-amplifier 170 and a line 172 with the terminal and line 112, 114 or 116, as the case may be. It is significant to observe that the coil and comparator units 10, which are the only parts of our improved apparatus concerned with handling or sensing electrical parameters of other than purely timed internal clock pulses or combinatorial binary logic type voltage levels, has been reduced to such a simple and straight forward arrangement of individual components of known reliability as to achieve not only a high degree of accuracy and dependability, but also to advantageously accomplish the conversion of the varying output voltage level on line 144 into binary logic type signals through merely comparative sensing rather than quantitive measurement of the varying value of the voltage whose level must be determined. Moreover, the units 10 significantly handle only direct current voltage level parameters, rather than difficult to handle and measure frequencies, alternating current impedance effect or the like.

The other units 2, 3, 4, 5, 6, 11, 12, 14 and 15 are essentially straight forward in their employment of conventional flip-flops, inverter-amplifiers, and various well-known types of binary logic functional gates, and are sufficiently disclosed by the accompanying drawings that the nature and gate level functioning of the circuitry employed in our preferred embodiment of apparatus will likely be at least somewhat self-evident to many of those skilled in the art merely from reference to the drawings and the preceding more general explanations. Nevertheless, some further comment concerning relevant details should be helpful in expediting full comprehension.

Referring now to FIG. 2, the system clock unit 2 includes a preferably crystal-controlled oscillator 174, the output of which is coupled to the clear (C) terminal of a flip-flop 176 which serves to convert the sine wave input from the oscillator 174 into a pulse sequence output at the NOT Q terminal of the flip-flop 176, such pulse output from the flip-flop 176 being at a frequency of occurrence rate of 1.8 Megacycles in the preferred embodiment. Such NOT Q output from the flip-flop 176 is coupled with the carry (C) terminal is a decade digital counter 178, which repetitively counts from "0" to "9", and thereby serves as the "units" counter for supplying the "units" time reference base signals presented at terminals and lines 22. The carryout (CO) terminal of the counter 178 is coupled with the carry (C) terminal of a second, identical counter 180 to serve as the "tens" counter of the system clock and to present the "tens" time reference base signals at the terminals and lines 24. Similarly, the carryout (CO) terminal of the counter 180 is coupled with the carry (C) terminal of another identical counter 182, which provides the "hundreds" time base reference signals at the terminals and lines 26. The carryout (CO) of the counter 182 is coupled with the carry (C) terminal of a flip-flop 184, which serves as a frequency divider and provides two interleaved sequences of timing pulses each having a frequency occurrence rate of 0.9 Kilocycles at the Q and NOT Q terminals thereof, which are respectively fed to the terminals and lines 28 and 30 for delivery to the coil drive units 5 and 6 respectively. These last mentioned timing pulses presented upon the lines 28 and 30 serve as initiate trigger signals, the alternating occurrence of which ultimately results in driving the respective coil drive units 5 and 6, both at count "000" of the main system clock, but during alternate full cycles of the latter.

The coupling unit 3 shown in FIG. 3 merely effects whatever connections are selected or "programmed", by hard-wiring into the unit 3, between the "units", "tens" and "hundreds" digital clock pulse signals received on the lines 22, 24 and 26 respectively with the terminals and lines 22, 24 and 26 respectively with the terminals and lines 32–54 going to the secondary timing and control unit 15 and the primary coil drive unit 5, an amplifier 186 desirably being included within each such connection. The coupling unit 4 shown in FIG. 4, is directly analogous to the unit 3 in every respect, except that only one set of "units", "tens" and "hundreds" timing signals is derived from the lines 22, 24 and 26 for delivery to the auxillary coil drive unit 6 over the lines 56, 58 and 60.

Figures 5, 6:
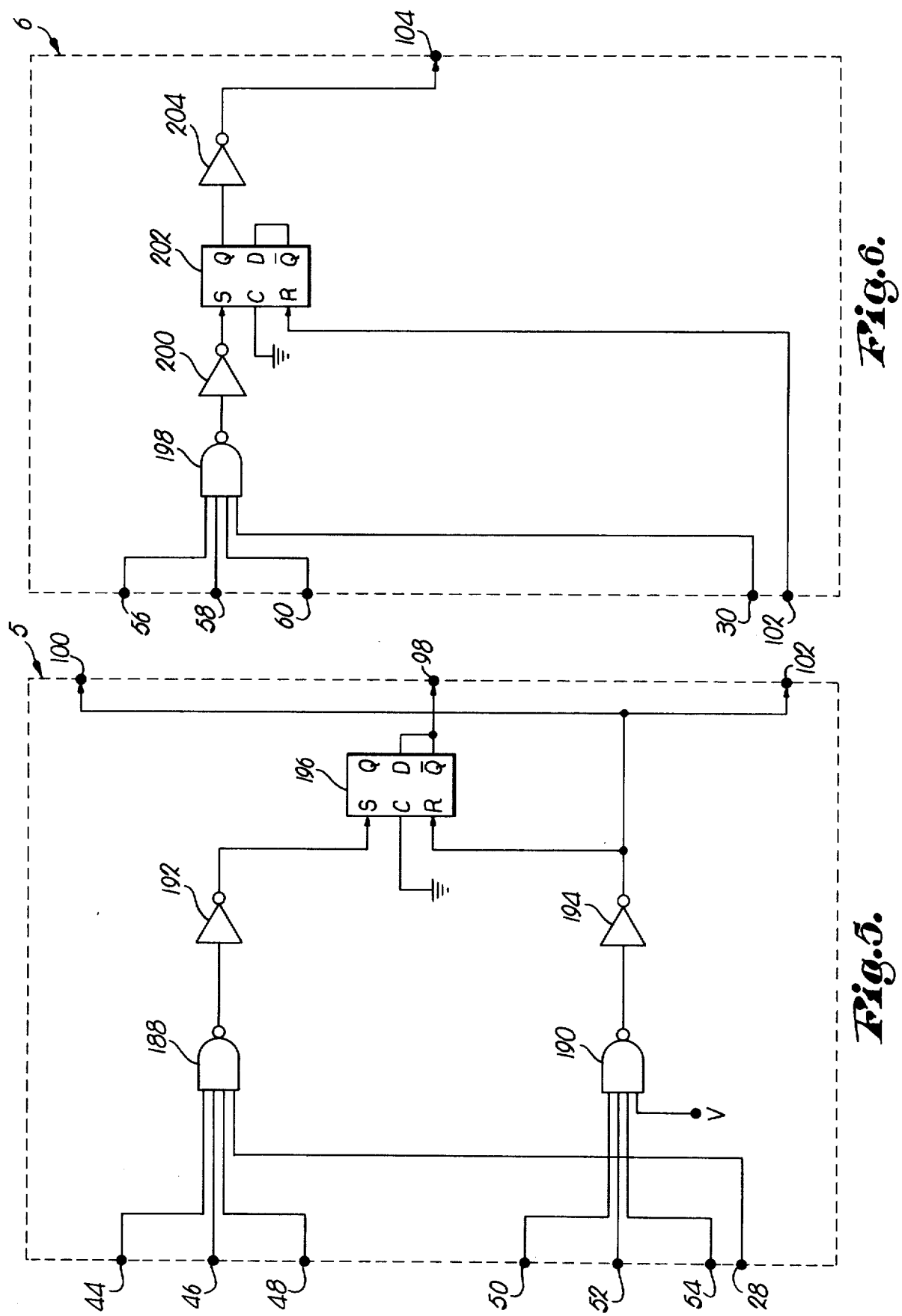
FIG. 5 is a schematic diagram of the primary coil drive units of the preferred embodiment.
FIG. 6 is a schematic diagram of the auxiliary coil drive unit of the preferred embodiment.

The primary coil drive unit 5 shown in FIG. 5, runs each set of time reference signals from lines 44, 46 and 48 and 50, 52 and 54 into input terminals of respectively NAND gates 188 and 190. The initiate trigger signal from line 28 is also applied as an input to the gate 188, while, in the preferred embodiment, positive supply voltage V is applied as an additional input to the gate 190. The outputs from NAND gates 180 and 190 are respectively fed through inverter-amplifiers 192 and 194 to the set (S) and reset (R) terminals of a flip-flop 196 for delivery from the NOT Q terminal of the flip-flop 196 of test initiate signal to the coil and comparator unit 10 for the coil 7 via terminals and line 98. The amplified and inverted output from the NAND gate 190 is also supplied to the secondary timing and control unit 15 and the auxillary coil drive units 6 through terminals and lines 100 and 102 respectively.

The auxillary coil drive unit 6 shown in FIG. 6, is generally equivalent to one-half of the unit 5. The set of time reference signals from the lines 56, 58 and 60 and the "alternate" initiate trigger signal from the line 30 are applied to the input of a NAND gate 198, the output of which is passed through an amplifier-inverter to the set (S) terminal of a flip-flop 202, while the signal from line 102 and the primary coil drive unit 5 is applied directly to the reset (R) terminal of the flip-flop 202. The output from the flip-flop 202 is derived from the Q terminal thereof and, after passage through an amplifier-inverter 204 is delivered to the terminals and line 104 as a test initiate signal for the coil and comparator units 10 associated with coils 8 and 9. It will be noted that the auxillary coil drive unit 6, by virtue of the connection through line 102 with the output circuit of the NAND gate 190 of the primary drive unit 5, essentially makes use of the latter without duplication thereof. It may be further observed that the time reference code signal applied through lines 44, 46 and 48 and lines 56, 58 and 60 to the drive units 5 and 6 respectively will typically be at count "002" of the system clock 2, while the coded time reference clock signals applied through lines 50, 52 and 54 to the drive unit 5 will typically be at system clock count "353" in the preferred embodiment, which provides adequate time for iterative cycling of the test sequence for a give coin under test during each full cycle of the system clock 2.

The coupling units 11 shown in FIG. 11, are essentially similar to the units 3 and 4, except that the units 11 provide for the derivation of a greater number of sets of time reference signal inputs for the validation logic units 12 from the same coded time reference clock signals carried by lines 22, 24, and 26 than were required for the drive units 5 and 6 and the secondary timing control unit 15. Again, the coupling units may be "programmed" by hard-wiring interchangable units of the same general type to provide differing selections of system clock derived time reference signals for use in the testing of various types and denominations of coins. The preferred embodiment for the coupling units 11 also demonstrates the manner in which multiple timing signal outputs may be obtained from coupling with any coded timing signal input line 22, 24 or 26, for example, note the interconnection in the illustrated unit 11 between the "2" line of lines 22 of the "units" group with both output lines 68 and 92. The coupling units also provide for a selective carrying through of the lines 106, 108 or 110 and the lines 112, 114 or 116, dependent upon the particular ones of coils 7, 8 and 9 that are to be used in testing the particular type or denomination or coin corresponding to each particular coupling unit 11.

The validation logic unit 12, shown in FIG. 12, includes four identical logic modules 13A, 13B, 13C and 13D, the details of which are further illustrated in FIG. 13 in which such identical modules are generally designated 13. The reset signal delivered by line 96 from the secondary timing and control unit 15 is applied to a NAND gate 206, the output of which is applied through a line 208 of the module 13D, and thence carried through each of the modules 13 to the next via lines and terminals 210. Similarly, a supply voltage V (typically plus 12 volts) is applied through a resistance 212 to terminal 214 of module 13A and thence carried via lines and terminals 216 through each module 13 to the next. Considering the input connections to the module 13A, for example, they include a first full set of coded "units", "tens" and "hundreds" timing reference signals received from lines 62, 64 and 66 and representing the time for commencement of the coincidence test interval after the appropriate predetermined period of delay following the test initiate signal and the energization of the corresponding one of coils 7, 8 or 9, a single "units" coded time reference signal received from the system clock unit 2 via line 68 (the significance of which singularity will be further commented upon), and a test result signal from a corresponding comparator 148 for the corresponding coil 7, 8 or 9 delivered via line 120. The time reference input signals from lines 62, 64 and 66 are applied to the input of one NAND gate 218 (see FIG. 13), while the single "units" time reference from the line 68 is applied to the input of another NAND gate 202. Outputs from NAND gates 218 and 220 are applied to a pair of inverted input OR gates 222 and 224, the outputs of which are cross-coupled with the inputs of the other in manner to function as a flip-flop for enabling the NAND gate 220 through the input connection 226 thereto from the output of the inverted input OR gate 222. Thus, the NAND gate 220, which serves to gate the termination of the coincidence test interval, effectively utilizes the "tens" and "hundreds" timing signals supplied to the NAND gate 218 from lines 64 and 66, without duplication of the NOR function thereon, this being a permissable expedient when the coincidence testing interval does not extend in time beyond the "0" to "9" range of the "units" timing of commencement of such interval. The outputs from NAND gates 218 and 220, together with the test result signal from line 120 are applied respectively to inverted input AND gates 228 and 230. The outputs of the latter are in turn respectively coupled with the Set input terminals of a corresponding pair of flip-flops 232 and 234, whose respective outputs are derived from the Q output terminals thereof and applied as inputs to an EXCLUSIVE OR gate 236. The output of gate 236 is the coin acceptance signal delivered to a respective line 238 from each of the modules 13A, 13B, 13C and 13D, which are in turn applied as the inputs to a NAND gate 240, the output of which is the coin acceptance signal delivered to line 128 and thence to the acceptance utilization enable unit 14, along with the utilization enable signal from line 94, which are fed to the input terminals of the inverted input AND gate 242 of the unit 14. The output from the inverted AND gate 242 of the utilization enable unit 14 is delivered to the line 130 leading to the utilization unit 20 for activating whatever action the latter is to take at the end of a testing cycle that has resulted in acceptance of the coin under test. It should be noted that the time reference signals derived from clock unit 2 and fed to each module 13 via the associated coupling unit 11 are so selected that the timing signal for the gate 218 of each module arrives earlier than the timing signal for the gate 220 of the same module, so that the time of gating of gate 218 represents the beginning and the time of gating of gate 220 the end of a testing interval of predetermined length commencing a predetermined period after "pulsing" of the corresponding coil 7, 8 or 9. Moreover, since the EXCLUSIVE OR gate 236 will produce an acceptance signal only when the gate 218 is actuated and the gate 220 remains unactuated, it will be understood that the acceptance signal can occur only when the corresponding comparator 148 or 152 has detected attainment by the output from the corresponding coil 7, 8 or 9 of the selected voltage reference level therefor both after the actuation of gate 218 and before the actuation of gate 220, that is, during the predetermined testing interval. Thus, attainment of the selected voltage reference level either too early or too late will not produce an acceptance signal at a terminal 238.

Figure 15:
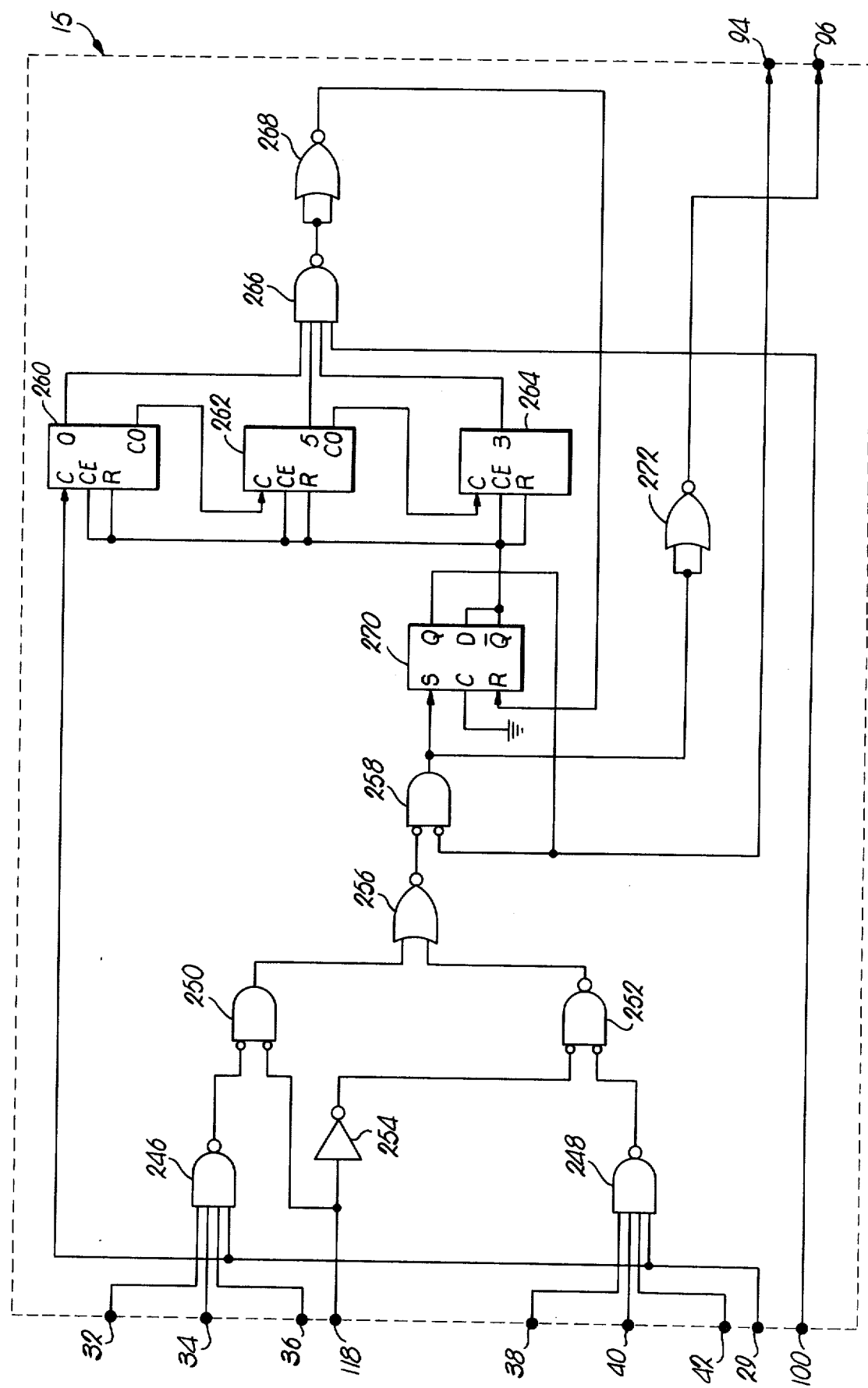
FIG. 15 is a schematic diagram of the secondary timing and control unit employed in the preferred embodiment for generating utilization enable and reset signals.

The secondary timing and control unit 15, shown in FIG. 15, which functions primarily to generate the utilization enable signal delivered to the utilization enable units via the line 94 and to provide the reset signal delivered to the validation logic units 12 via the line 96 for resetting the flip-flop information retaining elements of the latter at the end of a complete test cycle, uses two sets of coded time reference signals received from lines 32, 34 and 36 and 38, 40 and 42 respectively, as inputs for a pair of NAND gates 246 and 248, to which the initiate trigger signal from line 29 is also applied as an input. The outputs from the NAND gates 246 and 248 are respectively applied as inputs to a pair of inverted input AND gates 250 and 252. The coin presence and test initiate signal from the line 118 is also applied both as an input to the gate 250 and, through an inverted-amplifier 254, as the second input for the gate 252. The outputs of the inverted AND gates 252 are applied as inputs to a NOR gate 256, whose output in turn is applied as one of the inputs to an inverted input AND gate 258. Back-tracing somewhat, the initiate trigger from line 29 is also applied to the carry (C) input of a first decade counter 260, the carryout (CO) output terminal of which is coupled to the carry (C) input terminal of an identical counter 262, which in turn has its carryout (CO) output terminal coupled with the carry (C) input terminal of a third identical counter 264. The counters 260, 262 and 264 make up a secondary clock activated by the initiate trigger from line 29 and structurally capable of providing the count pulses for counts "000" through "999" although it will be noted that the "3", "5" and "0" outputs of the "hundreds", "tens" and "units" flip-flops 264, 262 and 260 respectively are all coupled as inputs to a NAND gate 266, along with the coin presence and test initiate signal from line 100, with the output of NAND gate 266 then coupled through a NOR gate 268 for inversion and application to the reset (R) input terminal of a flip-flop 270, so as to prevent the counters 260, 262 and 264 ever counting past the count "350", which represents the termination of a full testing cycle before same are reset to count "000" and during which a coin will pass by the coils 7, 8 and 9. Such resetting of the counters 260, 262 and 264 is controlled by connection of the NOT Q output terminal of the flip-flop 270 with the reset (R) input terminals of each of the counters 260, 262 and 264. The Q output terminal of flip-flop 270 provides both the utilization enable signal to line 94 and the second input for the inverted input AND gate 258, with the output of the latter coupled through an inverting NOR gate 272 to provide the reset signal for line 96 and also coupled with the set (S) terminal of the flip-flop 270.

Figure 16:
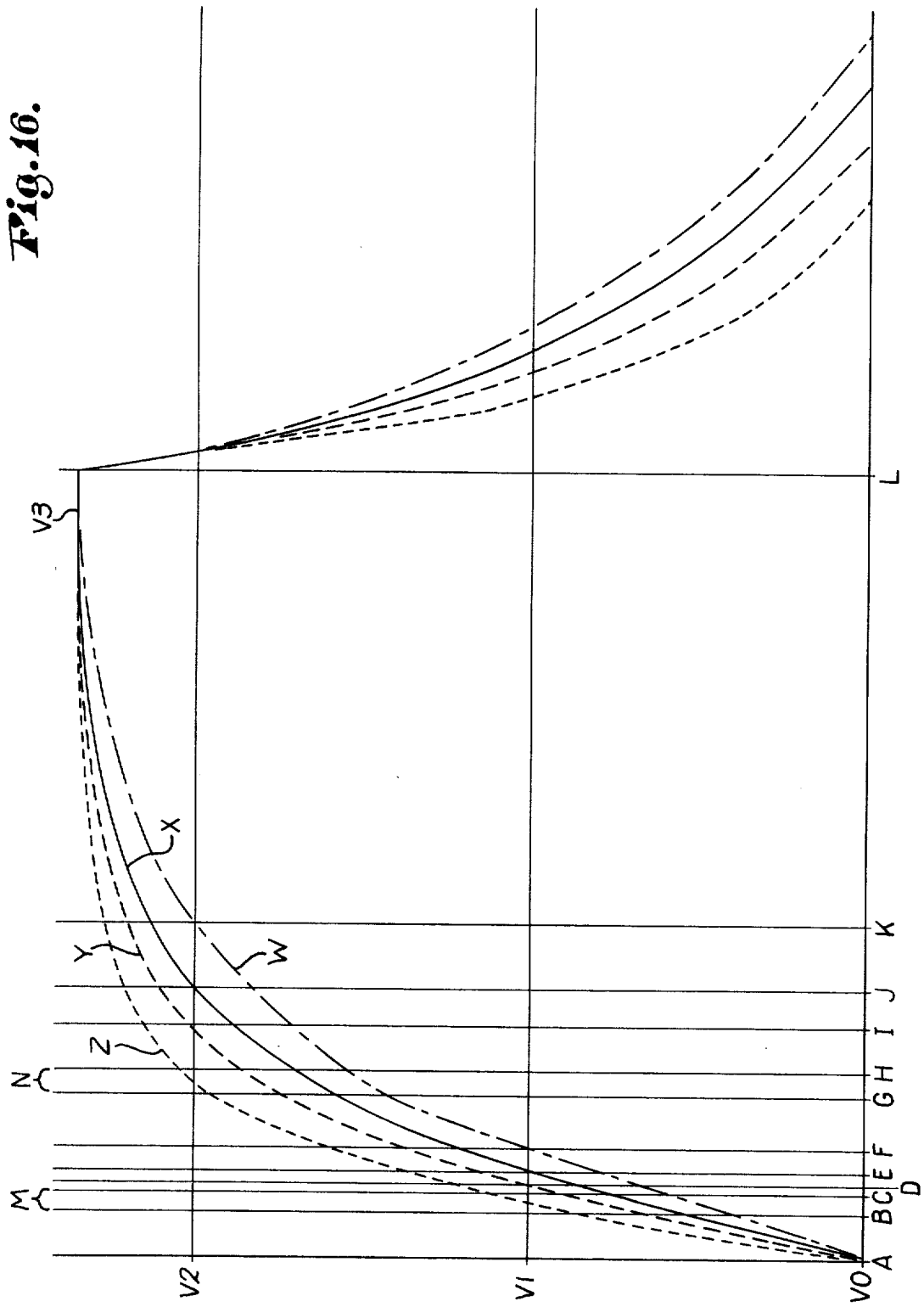
FIG. 16 is a somewhat exaggerated representation of certain curves referred to hereinafter in explaining the operation of the invention.

A more general over-view of the operation of our method and apparatus should next prove helpful in understanding the functioning of the invention. For such purpose, reference is initially made to FIG. 16, which shows several curves plotted in somewhat idealized fashion and with the scaling somewhat exaggerated for clarity of illustration. In FIG. 16 the abscissa of the curves represents the passage of time following initial energization of one of the testing coils, say 7, of one of the coil comparator units 10 (see FIG. 10), while the ordinate of the curves represents the potential developed across the resistance 142 associated with the coil 7 and applied via the leads 144-145 and 144-150 as the variable input to each of the comparators 148 and 152 of such unit 10, it being observed that such potential increases as what may be referred to as the "instantaneous effective impedance" of the coil 7 decreases with time following application of energization thereto.

The curve X in FIG. 16 indicates the manner in which the potential delivered to lead 144 will increase during the period following each initial energization of the coil 7 at time A, until a maximum or equilibrium level is attained as at V3, shortly prior to time L representing the end of the energizing pulse, when no coin or object to be tested is in proximity to the coil 7. Thus, the curve X represents the effect with time upon the potential being sensed in the unit 10, of the inherent response of the instantaneous effective impedance of the coil 7 to each energization thereof in the absence of any external influence thereon, such as when no coin is in the ramp zone 21 of the support 23 or when a coin introduced into the zone 21 has not yet reached or has passed by a position of proximity to the coil 7 that would naturally influence the effective impedance of the latter. Although the exact characteristics of a corresponding curve X for the coils 8 or 9 will naturally vary in terms of abscissa and ordinate values, the general nature of the manner in which the potential sensed at lead 144 will asymptotically approach a maximum or equilibrium level with the passage of time following initial energization, and the general nature of the effect upon such curve when it is under the influence of a proximate coin under test, will be analogous to those depicted in FIG. 16 for the coil 7.

The influence upon the curve X exerted by a coin or object to be tested being in proximity to the coil 7 may operate to displace the resultant curve in either direction from the curve X, depending upon the nature of the coin or object brought into proximity with the coil 7. For example, the curve W in FIG. 16 represents the displacement on a time oriented basis of the sensed potential when a coin of ferromagnetic metal such as steel or iron is fully juxtaposed in proximity to the coil 7 (the Canadian "nickle" and the German 5 and 10 Pfenning coins being examples of such coins). On the other hand, the curve Z of FIG. 16 is typical of the effect of silver coins or coins of the copper-nickel layered variety relatively recently introduced in the United States. The latter type coins will be selected for purposes of further discussion of the manner in which the effect of a coin upon the instantaneous effective impedance of the coil 7, and thereby the level of the potential sensed at lead 144, relates to the functioning of the invention.

A given coin released at the top of the ramp zone 21 for gravitational movement toward the lower end of the latter may typically consume, say, 0.3 second in making its rolling descent, during which time it will move into approaching partial juxtaposition, full juxtaposition and partial departing juxtaposition with each of the coils 7, 8 and 9 successively. Although such ramp transit time is not particularly critical, it is significant that the coin being tested will typically be in sufficiently proximate juxtaposition to materially influence the effective impedance of each coil only something of the order of 0.1 second or less. Moreover, during continual movement of the coin down the ramp and past the coil 7, for example, the influence exerted by the coin upon the effective impedance of the coil 7 will gradually increase from the time the coin starts to enter proximity with the coil 7, to a peak of influence at full juxtaposition, followed by a decreasing amount of influence as the coin departs from its position of maximum juxtaposition with the coil 7. As previously noted, therefore, the coils 7, 8 and 9 are repeatedly energized in a "pulsed" fashion a number of times during the period that a coin is approaching and passing full juxtaposition with each coil, in order that the required testing can automatically be accomplished at the moment of maximum juxtaposition of the coin with the coil, even when the coin is continuously moving. In the preferred embodiment employing a 0.9 kilocycle clock output from the unit 2, each coil is iteratively energized with pulses of that repetition rate, or a new pulse about every 1.1 millisecond; and each such pulse may be about 0.3 millisecond in duration (represented by the interval from time A to time L in FIG. 16). Thus, each coil 7, 8 and 9 may typically be pulsed with testing energization about 30 times while a coin is moving by it.

The curve Y in FIG. 16 depicts the displacement of the potential sensed at lead 144 during each pulsing of the coil 7 from the curve X for the coil 7 alone, which is caused by a coin that has entered into only partial juxtaposition with the coil 7, as when approaching or departing; and it will be understood that the curve Y really is just one of many curves that could be shown between the "coil alone" curve X and the "full juxtaposition" curve Z as representing functionally different degrees of "coupling" between the coin and the coil 7 as the coin passes through the latter.

Bearing in mind that the invention must accomplish discrimination between genuine coins of a given denomination and unwanted coins of different denomination or "slugs" and other spurious objects during the very brief periods that the objects are in substantially maximum juxtaposition with the test coils, it will be apparent that the testing criteria may most advantageously be established in relation to the condition of maximum displacement of the curve Z from the curve X, which represents the physical condition of substantially full juxtaposition of the coin with the particular coil 7, 8 or 9.

Moreover, it should be significantly recalled that the present invention attains improved sensitivity and reliability of discrimination by avoiding or minimizing critical measurements of purely electrical parameters and by, instead, restricting critical sensings only to ones involving time and, more accurately, to the sensing of time coincidence of events permitting the main testing functions to be accomplished with highly accurate and reliable digital techniques.

The manner in which the invention is prepared for functioning under practical operating conditions deserves brief further comment. The resistances 154 and 156 associated with the comparator 148 and the resistances 160 and 162 associated with comparator 152 are selected or adjusted to provide for the change of state operation of the comparators 148 and 152 at any pair of suitable potential levels V2 and V1 respectively, which are reasonably spaced at intervals below the level of the maximum or equilibrium potential V3 for the particular coils 7, 8 or 9 and the supply voltage being used (about 4 volts for V2 and 2 volts for V1 in the preferred embodiment). Those skilled in the art will understand that the last mentioned step is really a part of the initial design process for the apparatus and need be done only once for the testing apparatus to be employed with any particular selected group of coins to be validated.

With the potential levels of V2 and V1 thus established for the comparators 148 and 152 of each unit 10, the next preliminary step in the design or initial adjustment of the apparatus for validating particular types of selected coins is to move a sufficient number of known genuine specimens of each type of coin to be tested along the ramp zone 21 (or otherwise juxtapose the same with each of the coils 7, 8 and 9 to be employed in testing that type of coin), in order to statistically determine, in terms of a narrow range or interval of time typically of the order of 5 microseconds or less, the time required after initial energization of each coil (when under the influence of full juxtaposition with a genuine coin of the type in question) for the output potential on lead 144 of each comparator unit 10 to rise to each of the potential levels V1 and V2. Such "one time determination" can be made in various fashions that would occur to those skilled in the art as through the use of appropriate time measuring instruments temporarily coupled for such purpose with the energization circuit of a coil 7, 8 or 9 and the outputs from the associated comparators 148 and 152, or may be accomplished with the apparatus' own clock unit 2 and detection logic by employing switchable test jigs temporarily plugged into the apparatus in lieu of the programmed coupling units 3, 4 and 11 for the purpose of selectively deriving various time or gating signals from the clock unit 2 until the timing of a proper acceptance interval is determined at each of levels V1 and V2 for each coin type and coil combination to be employed in the testing. For example, in FIG. 16, such pre-testing of genuine coins of the type exerting an influence as depicted by the curve Z will be found with amazing consistency to provide a potential on lead 144 which rises to the level V1 within the very short interval M between times B and C following the initial coil energization at time A. The instant at which the potential on lead 144 attains level V1 is, of course, sensed by the comparator 152, which immediately produces a change of state signal in response thereto. Similarly, the minimum and maximum times G and H defining a narrow time interval N during which a given type of coin will cause the potential on lead 144 to be of level V2 will be determined in like fashion and with particular reference to the consequent change of state in the output from the comparator 148.

It will be observed from FIG. 16 that the potential at lead 144 when there is no coin juxtaposed with the coil 7, as depicted by curve X, also arrives at level V1 at time E and at level V2 at time J, but both are too late to fall within the corresponding acceptance time intervals M and N pre-established as the testing criteria for the coin-coil combination in question. It will be further noted from the curve Y in FIG. 16 that the potential levels V1 and V2 are again attained too late (at times C and I respectively) when the coin is not fully juxtaposed with the coil 7. As earlier indicated, the maximum influence curves Z have been found to vary sufficiently for different types of coins that extremely accurate validation and discrimination can normally be accomplished for most coins with only a pair of coils (normally 8 and either 7 or 9) and only two sensing levels V1 and V2 and a corresponding pair of acceptance time intervals M and N for each coin type, although additional coils or sensing levels could be provided, if desired. The time oriented nature of the critical sensing and the use of very short time intervals M and N, provides for the required discrimination being handled with extreme accuracy and reliability by the digital time coincidence logic sensing portion of the apparatus. Once suitable acceptance time limits B and C for level V1 and G and H for level V2 (and the corresponding acceptance intervals M and N defined thereby) are determined by pre-testing of a reasonable number of genuine coins, for each coin-coil combination to be employed in testing each particular type of coin, then the design of the programmed coupling units 3, 4 and 11 may be finalized with appropriate connections for providing the required time gate signals from the clock unit 2 to the digital logic portion of the apparatus. Moreover, and this is one of the great conveniences of our apparatus which enhances its commercial utility, plug-in type coupling units 3, 4 and 11 may be provided for each particular type of coin that it might be desired to test, and any particular installation of the apparatus may then be quickly adapted for testing any desired combination of such coin types merely by plugging in the appropriate corresponding programmed coupling units 3, 4 and 11.

With the foregoing considerations in mind, the general operating sequence of the apparatus, employing the more detailed functions previously described, may be summarized as follows. A coin to be tested is released at the top of the ramp zone 21 and commences to roll down the latter under the influence of gravity. When such coin commences to come into proximity with the first coil 7, assuming a silver or coppernickle layered coin, the effective impedance (inductive reactance) of the coil 7 will start to decrease under the "core influence" of the coin. Meanwhile, the clock unit 2 is controlling the supply of a continuing series of energizing pulses to the coil 7 from the switched transistor 140. When the coin has moved into sufficient juxtaposition with the coil 7, and the effective impedance of the latter has thereby been sufficiently lowered by the presence of the coin in proximity thereto, the potential on the lead 144 of the corresponding unit 10 will rise during a given energization pulse to a selected level (say, V2) to produce a change of state in the comparator 148 at a time selected for generating a test sequence start signal. As should be clear, the potential on the lead 144 of each unit 10 rises through each of the levels V1 and V2 at some times during every pulsed energization of the associated coil 7, 8 or 9, even when no coin is in proximity to such coil, as represented by the intersections of curve X with levels V1 and V2 at times E and J; and the comparators 152 and 148 of each unit 10 will accordingly change state during each energization pulse at whatever times the potential on lead 144 passes through levels V1 and V2, as determined by the absence or presence of a coin and its degree of juxtaposition with the coil. As previously noted, the time intervals or "windows" M and N used for actual testing are preferably selected to coincide with the passage through levels V1 and V2 of the curve Z representing maximum influence of the coin at full juxtaposition with the coil. The time selected for determining whether a coin is in sufficient proximity to the coil 7 to generate a test sequence start signal is, therefore, chosen such as to be between times H and J associated with curves Z and X respectively (and might well be, for example, at time I). Thus, when the coin has moved into sufficient proximity to coil 7 to generate an intermediate curve (Y of FIG. 16, for instance) having an intersection with level V2 at a time (I of FIG. 16, for instance) between times H and J, the change of state signal carried from the comparator 148 to the secondary timing and control unit 15 via lead 118 (FIG. 1) will be gated with appropriate clock count signals received by the unit 15 from the clock unit 2 and selected by the programmed coupling unit 3, so as to activate the timing and control unit 15 to start a test sequence cycle of the apparatus (of typically about 0.3 second duration, during which the coin will traverse the ramp 21, will be tested by the ones of coils 7, 8 and 9 used for the particular coin type being tested for, and will either be accepted as genuine or rejected by the apparatus). As previously noted, the apparatus is reset at the end of each test sequence cycle.

With the unit 15 thus activated, the coin proceeds down the ramp 21 into successive juxtaposition with the coils 7, 8 and 9, the pulsed energization of which continues. Meanwhile, the comparators 152 and 148 of each unit 10 are sensing whenever the potential on the lead 144 thereof passes each of levels V1 and V2 and are producing a change of state signal at its output in response to each such occurrence. It may be worth reemphasizing that such a change of state occurs, and such a signal is produced by each comparator 148 and 152, during each pulsed energization of each coil 7, 8 and 9; wherefore it must be understood that the critical parameter to be used in the testing is not a quantitative measurement of the level of the potentials which activate the comparators 148 and 152, but rather the times at which such activations occur in relation to the time A of commencement of the then current energizing pulse for the associated coil 7, 8 or 9.

Thus, the important thing accomplished by the portions of the apparatus involving the coil and comparator units 10 and the units 3, 4, 5, and 6 associated therewith, all under the timing control of the clock unit 2, are the two change of state output signals delivered from the comparators 152 and 148 of each unit 10 via output leads 168 and 172, which represent merely the times of occurrence of attainment by the potential on the associated lead 144 of the selected levels such as V1 and V2. Such change of state signals from each of the units 10 are, of course, time correlated with the time frame of reference provided by the clock unit 2 for the rest of the apparatus, since the timing signals for all parts of the apparatus are derived from the same clock unit 2. The particular change of state signals from the comparators 10 to be employed in testing a given type of coin are selected by the programmed coupling units 11 in use in the apparatus and are coupled via the latter with the logic units 12, where such signals are utilized in the gating circuitry of the logic units 12 to determine whether or not the change of state signals from particular comparators 148 and 152 occur in time coincidence with timing signals from the clock unit 2 that have also been selected as applicable to the particular type of coin under test by the programmed coupling modules 11 in use in the apparatus.

The logic units 12 are normally held in a reset state by the reset signal delivered from the timing and control unit 15 via the lead 96 (See: FIGS. 1 and 12) until a test sequence cycle has been commenced. Upon the start of a test sequence cycle, however, the reset signal to the logic modules 12 is withdrawn by the control unit 15 and will not be reapplied thereto until the period of duration of the test sequence cycle initiated as above described when the coin first approaches the coil 7 has been completed.

It is believed that the operation of the logic units 12 at the gate level of detail should be sufficiently apparent to those skilled in the art both from the nature and relationships of the gates employed and what has previously been noted in such regard hereinabove as to require no further elaboration or repetition. The same would appear to be true in connection with the manner in which the enable units 14 function in cooperation with the logic units 12 and in response to enable signals received from the control unit 15 via lead 94. What primarily remains for emphasis in this summary of operation, therefore, is the fact that the employment of the common frame of time reference provided by the clock unit 2 for both the timing signals used by the logic units 12 and the control of the pulsed energization of coils 7, 8 and 9 permits the sensings ultimately required and used in testing an unknown coin or object to be reduced to a mere matter of detecting the presence or absence of time coincidence, which can be handled with such high accuracy and reliability by digital gating circuitry such as that employed in the units 12 and 14 (and with that high degree of flexibility permitted by the programmed coupling units 11).

The manner in which this invention handles what at first consideration might be deemed a possible vulnerability of the method and apparatus of this invention to supposed error in testing, and which could constitute a very serious problem with other possible approaches to electronic testing, should be briefly noted. For illustration, assume that one of the types of coins to be tested is the U.S. dime, and that programmed coupling units 11 are installed to accommodate such testing of dimes through the use of, say, coils 7 and 8 and appropriately predetermined time "windows" M and N (See: FIG. 16) for accepting genuine dimes. Next assume that a U.S. quarter made from essentially the same materials as a U.S. dime is passed down the testing ramp 21. The influence of the quarter as it comes into full juxtaposition with each of the coils 7 and 8 would displace its curve comparable to the Z curve for the dime even further from the "coil alone" curve X of FIG. 16, and in the same direction. Thus, at some intermediate position of partial juxtaposition of the quarter with the coil 7 and/or 8, the instantaneous effective influence of the quarter may actually be sufficiently near coincidence with the curve Z for a dime that the quarter will cause a "dime accept" setting of certain gates to occur in the logic units 12. Where two or more coils 7, 8 or 9 are employed for each type of coin to be tested, such a false "preliminary accept" condition will not normally arise, because of the different and highly sensitive responses of different coils to different types of coins. Assuming that there may be some coin type with respect to which such a situation could otherwise arise, however, the apparatus of this invention still accomplishes the required discrimination and validity testing. This can best be explained by reference to FIG. 13, wherein it will be noted that for an accept signal to be presented at the output point 238, the EXCLUSIVE OR gate 236 requires not only that the flip-flop 232 shall be set, but that the flip-flop 234 shall not be set. What occurs in such a situation involving the passage of a quarter through portions of the apparatus set up for testing a dime is that, as the quarter comes into some particular partial juxtaposition with a coil such as 7 to an extent causing the influence curve of the quarter to substantially coincide with the predetermined maximum displacement curve Z for a dime, the flip-flop 232 will initially be set into its accept condition. As the quarter proceeds down the ramp 21 into fuller juxtaposition with the coil 7, however, it will also then set the flip-flop 234, which is a condition automatically nullifying the previously false "accept" registered by the flip-flop 232 by virtue of the EXCLUSIVE OR gate 236.

To complete the picture of the way in which the apparatus of this invention automatically protects itself against false validations under such conditions it is necessary merely to observe that the test enable signal required via lead 94 at the unit 14 in order to provide a final successful test and acceptance output at point 130 is not delivered to the unit 14 from the unit 15 until near the end of the test sequence cycle, so that all of the flip-flops 232 and 234 (each pair of which represents a sensing of whether the associated comparator change of state signal falls within the acceptance time "window" M or N) must be in their respectively set and unset conditions for the type of coin being tested.

From the preceding description of both the method and apparatus aspects of our invention, as well as from the detailed showing thereof in the accompanying drawings, it is apparent that, although the underlying concepts and improvements involved in the invention are believed to be relatively basic as compared with the known state of the prior art, it should be equally apparent that those skilled in the art could make numerous modifications to details of the preferred embodiment of apparatus disclosed as illustrative without real departure from the gist and substance of the underlying concepts and improvements upon which the invention is predicated. Accordingly, it is intended that the accompanying claims should be deemed limited only by the fair scope thereof, in the light of the scope of our actual invention, so as to extend to the subject matter defined by the claims and state of the art equivalent modifications thereof.

We claim:

1. In apparatus for testing metallic objects such as coins:
   at least a pair of stations at which said objects may be tested;
   means for causing continuous movement of an object to be tested along a predetermined path successively toward, through and away from each of said stations;
   electrical impedance means for and disposed adjacent each of said stations respectively,
   each of said impedance means having a different normal electrical impedance,
   the effective electrical impedance of each of said impedance means being altered from said normal impedance thereof when a metallic object is at the corresponding station;
   electrical circuit means for and coupled with each of said impedance means respectively for providing an electrical output when said circuit means is energized;
   means for and coupled with each of said circuit means respectively effective when activated for energizing the corresponding circuit means and impedance means with direct current electrical power,
   each of said circuit means having a different time constant of delay in reaching operational equilibrium after commencement of energization thereof materially dependent upon the effective electrical impedance of the corresponding impedance means,
   said output of each of said circuit means being a direct current voltage of level which varies as a function of both said time constant of delay and the period of time that has elapsed following commencement of energization of said circuit means;
   sensing means for and coupled with each of said circuit means respectively for detecting when the voltage level of said output of said circuit means attains a predetermined level;
   control means, including means for activating each of said energizing means when an object to be tested is at the corresponding station, and means for measuring the lapse of time following commencement of energization of each of said circuit means; and
   testing means for and coupled with each of said sensing means respectively and with said time measuring means for determining whether or not the voltage level of said output for each of said circuit means is detected to have attained said respective predetermined level thereof during a testing interval occurring a predetermined period of time after commencement of energization of the corresponding circuit means,
   the combinations of said predetermined level of voltage output and said predetermined period of time being different for each of said circuit means.

2. The invention of claim 1, wherein each of said impedance means is an inductance coil.

3. The invention of claim 1, wherein said object moves at a rate relative to the lengths of said predetermined periods of time and said testing intervals such that, although continuing to move, said object effectively remains at each of said stations during a period substantially in excess of that required for testing thereof.

4. The invention of claim 1, wherein said movement causing means includes an inclined support presenting a ramp down which a coin may roll along said path under the influence of gravity.

5. The invention of claim 1, wherein each of said impedance means is an inductance coil, at least one of said inductance coils is wound about an axis intersecting said path and has the turns thereof disposed substantially parallel to said path, and another of said inductance coils is wound about an axis substantially parallel to said path and has the turns thereof disposed in transversely circumscribing relationship to said path.

6. The invention of claim 1, wherein said measuring means includes clock means for generating a sequence of electrical time reference signals at fixed intervals of relatively short duration compared with said predetermined periods of time, and means for counting said signals.

7. The invention of claim 1, wherein each of said sensing means includes a plurality of voltage comparators coupled with said output of the corresponding circuit means and with reference voltage inputs of differing level.

8. The invention of claim 1, wherein said time measuring means generates a test enable signal at said predetermined period of time after commencement of energization of each of said circuit means; and said testing means includes means for generating a test result signal when the voltage level of said output of each of said circuit means is within said range, and means for detecting when said test result signals occur in time coincidence with said test enable signals for producing accept signals in response thereto.

9. In apparatus for testing metallic objects such as coins:
   an inductance coil;
   means for presenting an object to be tested in proximate relationship with said coil for altering the effective impedance of the latter;
   a fixed impedance;
   an electrical circuit having said coil and said fixed impedance coupled therein;
   means coupled with said circuit, and including electrically responsive switching means, for energizing said circuit with a direct current voltage when said switching means is activated;
   output terminal means coupled with said circuit at which is presented a direct current voltage output of level varying as a function of time and the effective impedance of said coil after energization of said circuit;
   clock means, including oscillator means and digital counter means coupled with said oscillator means and provided with a plurality of time base reference signal terminal means at which are respectively presented timing signals including at least an initiate signal and a voltage compare enable signal occurring a predetermined period of time after said initiate signal;
   means coupling said time base reference signal terminal means for said initiate signal with said switching means for activating the latter to energize said circuit when said initiate signal occurs;
   first voltage comparator means, including a source of direct current voltage of a first predetermined fixed reference level, coupled with said output terminal means for detecting the relationship between the respective direct current voltage levels of said output from said circuit and said first fixed reference level voltage, and provided with first voltage test result signal terminal means at which is presented a first voltage test result signal when said respective voltage levels are in a predetermined relationship to each other;
   first signal coincidence detecting means coupled with said time base reference signal terminal means for said voltage compare enable signal and with said first voltage test result signal terminal means, and provided with first voltage compare accept signal terminal means at which a first voltage compare accept signal is presented when said voltage compare enable signal and said first voltage test result signal coincide in time;
   second voltage comparator means, including a source of direct current voltage of a second predetermined fixed reference level differing from the level of the first fixed reference voltage, coupled with said output terminal means for detecting the relationship between the respective direct current voltage levels of said output from said circuit and said second fixed reference level voltage, and provided with second voltage test result signal terminal means at which is presented a second voltage test result signal when the levels of said output voltage and said second fixed reference voltage are in a predetermined relationship with each other;
   second signal coincidence detecting means coupled with said time base reference signal terminal means for said voltage compare enable signal and with said second voltage test result signal terminal means, and provided with second voltage compare accept signal terminal means at which a second voltage compare accept signal is presented when said enable and second voltage test result signals coincide in time; and
   third signal coincidence detecting means coupled with said first and said second voltage compare accept signal terminal means, and provided with object acceptance signal terminal means at which an object acceptance signal is presented when said first and second voltage compare accept signals coincide in time.

10. The invention of claim 9, wherein said time base reference signal terminal means include such terminal means for also presenting a voltage compare enable-end timing signal occurring a predetermined interval of time after said voltage compare enable signal; and there is provided fourth and fifth signal coincidence detecting means each coupled with said time base reference signal terminal means for said voltage compare enable-end signal and respectively interposed between said first and second voltage compare accept signal terminal means and said third signal coincidence detecting means for preventing presentation of said object acceptance signal at said object acceptance signal terminal means unless said first and second voltage compare accept signals occur during the interval between commencement of said voltage compare enable signal and the commencement of said voltage compare enable-end signal.

11. The invention of claim 9, wherein is provided means for electrically sensing the presence of an object to be tested in said relationship with said coil and producing an object ready signal in response thereto; test result utilization control means, including second digital time counter means coupled with said clock means and further signal coincidence detecting means coupled with said second counter means and said object presence sensing means for generating a test result utilization enable signal when an object is present in said initiate signal to permit completion of a testing cycle and generation of said object acceptance signal if the object is genuine; and additional signal coincidence detecting means coupled with said control means and said object acceptance signal terminal means for generating an object accepted utilization signal when said object acceptance and test result utilization enable signals coincide in time.

12. The invention of claim 9 wherein are provided interchangeable programmed means for selectively coupling at least said signal coincidence detecting means with various selected ones of said time base reference signal terminal means for conveniently changing the predetermined period of time by which said voltage compare enable signal follows said initiate signal.

* * * * *